United States Patent
Yakovlev

(10) Patent No.: US 11,555,994 B2
(45) Date of Patent: Jan. 17, 2023

(54) WIDE-FIELD DEEP UV RAMAN MICROSCOPE

(71) Applicant: The Texas A&M University System, College Station, TX (US)

(72) Inventor: Vladislav V. Yakovlev, College Station, TX (US)

(73) Assignee: THE TEXAS A&M UNIVERSITY SYSTEM, College Station, TX (US)

(*) Notice: Subject to any disclaimer, the term of this patent is extended or adjusted under 35 U.S.C. 154(b) by 0 days.

(21) Appl. No.: 17/326,576

(22) Filed: May 21, 2021

(65) Prior Publication Data

US 2022/0066189 A1 Mar. 3, 2022

Related U.S. Application Data

(60) Provisional application No. 63/028,974, filed on May 22, 2020.

(51) Int. Cl.
| | | |
|---|---|---|
| *G02B 21/16* | (2006.01) | |
| *G01J 3/28* | (2006.01) | |
| *G02B 21/18* | (2006.01) | |
| *G02B 21/08* | (2006.01) | |

(52) U.S. Cl.
CPC .......... *G02B 21/16* (2013.01); *G01J 3/2823* (2013.01); *G02B 21/08* (2013.01); *G02B 21/18* (2013.01)

(58) Field of Classification Search
CPC ........ G02B 21/16; G02B 21/08; G02B 21/18; G01J 3/2823
See application file for complete search history.

(56) References Cited

U.S. PATENT DOCUMENTS

| 9,927,417 B2 | 3/2018 | Yakovlev et al. | |
|---|---|---|---|
| 2004/0027570 A1* | 2/2004 | Caldwell | G01S 17/95 356/28 |
| 2005/0260741 A1* | 11/2005 | Albertson | G01N 21/6452 348/79 |
| 2007/0035818 A1* | 2/2007 | Bahatt | G01N 21/76 359/366 |

(Continued)

FOREIGN PATENT DOCUMENTS

WO WO-2021072408 A1 * 4/2021

OTHER PUBLICATIONS

R. S. Jakubek, J. Handen, S. E. White et al., "Ultraviolet resonance Raman spectroscopic markers for protein structure and dynamics," Trac-Trends in Analytical Chemistry, 103, 223-229 (2018).

(Continued)

*Primary Examiner* — David P Porta
*Assistant Examiner* — Mamadou Faye
(74) *Attorney, Agent, or Firm* — Meuner Carlin & Curfman LLC

(57) ABSTRACT

A spectroscopy device includes an incoherent light source, tunable to a predetermined emission wavelength; a microscope platform comprising a microscope objective comprising a deep-UV optimized objective and a focal plane defined thereon; a notch filter having an absorption frequency matched to the emission wavelength; and a frequency-selective optical path from the wide-field UV light source to the microscope platform onto the focal plane and from the focal plane through the notch filter.

15 Claims, 8 Drawing Sheets

(56) References Cited

U.S. PATENT DOCUMENTS

| | | | | |
|---|---|---|---|---|
| 2014/0303504 A1* | 10/2014 | Stankovic | ............ | A61B 5/0071 600/476 |
| 2016/0041095 A1* | 2/2016 | Rothberg | ............ | C12Q 1/6874 506/4 |

OTHER PUBLICATIONS

S. J. Parikh, K. W. Goyne, A. J. Margenot et al., "Soil Chemical Insights Provided through Vibrational Spectroscopy" Elsevier, (2014), 149 pages.

J. W. Ager, R. K. Nalla, G. Balooch et al., "On the Increasing Fragility of Human Teeth With Age: A Deep-UV Resonance Raman Study," Journal of Bone and Mineral Research, 21(12), 1879-1887 (2006).

A. Shutov, G. I. Petrov, D. Wang, M. O. Scully, and V. V. Yakovlev, "Highly efficient tunable picosecond deep ultraviolet laser system for Raman spectroscopy," Optics Letters 44(23), 5760-5763 (2019).

M. A. Troyanova-Wood, G. I. Petrov, and V. V. Yakovlev, "Simple and inexpensive instrument for deep-UV Raman spectroscopy," Journal of Raman Spectroscopy 44(12): 1789-1791 (2013).

V. Thompson, J. N. Bixler, B. H. Hokr, G. D. Noojin, M. O. Scully, and V. V. Yakovlev, "Single-shot chemical detection and identification with compressed hyperspectral Raman imaging," Opt. Lett. 42, 2169-2172 (2017).

M. A. Keppler, E. M. Gil, S. P. O'Connor, G. D. Noojin, V. V. Yakovlev, and J. N. Bixler, "Compressed hyperspectral Raman microscope for imaging tissues and cellular structures," in Optical Interactions with Tissue and Cells XXXI, B. L. Ibey and N. Linz, eds. (SPIE, 2020), p. 22, [15] Proceedings vol. 11238, Optical Interactions with Tissue and Cells XXXI; 112380N (2020) https://doi.org/10.1117/12.2544571.

S. A. Asher, "UV resonance Raman spectroscopy for analytical, physical, and biophysical chemistry. 1," Analytical Chemistry 65, A59-A66 (1993).

Q. Wu, T. Hamilton, W. H. Nelson, S. Elliott, J. F. Sperry, and M. Wu, "UV Raman spectral intensities of E. coli and other bacteria excited at 228.9, 244.0, and 248.2 nm," Anal. Chem. 73, 3432-3440 (2001).

Z. Q. Wen and G. J. Thomas, "UV resonance Raman spectroscopy of DNA and protein constituents of viruses: Assignments and cross sections for excitations at 257, 244, 238, and 229 nm," Biopolymers 45, 247-256 (1998).

J. M. Benevides, S. A. Overman, and G. J. Thomas, "Raman, polarized Raman and ultraviolet resonance Raman spectroscopy of nucleic acids and their complexes," J. Raman Spectrosc. 36, 279-299 (2005).

M. Troyanova-Wood, G. I. Petrov, and V. V. Yakovlev, "Deep-ultraviolet Yesonance Raman spectroscopy for chemical sensing," Optical Diagnostics and Sensing XIII: Toward Point-of-Care Diagnostics 8591, (2013).

G. J. Thomas, "New structural insights from Raman Spectroscopy of proteins and their assemblies," Biopolymers 67, 214-225 (2002).

M. Talati and P. K. Jha, "Acoustic phonon quantization and low-frequency Raman spectra of spherical viruses," Phys. Rev. E 73, 6 (2006).

S. Sirotkin, A. Mermet, M. Bergoin, V. Ward, and J. L. Van Etten, "Viruses as nanoparticles: Structure versus collective dynamics," Phys. Rev. E 90, (2014).

J. D. Driskell, K. M. Kwarta, R. J. Lipert, M. D. Porter, J. D. Neill, and J. F. Ridpath, "Low-level detection of viral pathogens by a surface-enhanced Raman scattering based immunoassay," Anal. Chem. 77, 6147-6154 (2005).

S. Shanmukh, L. Jones, J. Driskell, Y. Zhao, R. Dluhy, and R. A. Tripp, "Rapid and sensitive detection of respiratory virus molecular signatures using a silver nanorod array SERS substrate," Nano Lett. 6, 2630-2636 (2006).

S. T. McCain, M. E. Gehm, Y. Wang, N. P. Pitsianis, and D. J. Brady, "Coded aperture Raman spectroscopy for quantitative measurements of ethanol in a tissue phantom," Applied Spectroscopy 60, 663-671 (2006).

D. J. Lum, S. H. Knarr, and J. C. Howell, "Fast Hadamard transforms for compressive sensing of joint systems: measurement of a 3.2 million-dimensional bi-photon probability distribution," Opt. Express 23, 27636-27649 (2015).

E. M. Gil, M. A. Keppler, V. V. Yakovlev, A. Boretsky, and J. N. Bixler, "Comparison of various neural network-based models for 10 retinal lesion analysis," in Optical Interactions with Tissue and Cells XXX, H. T. Beier and B. L. Ibey, eds., Proceedings of SPIE (Spie-Int Soc Optical Engineering, 2019), vol. 10876.

C. B. Marble, X. Xu, M. A. Keppler, E. M. Gil, G. I. Petrov, D. Wang, and V. V. Yakovlev, "Hyper-Raman optical activity of biologically relevant chiral molecules," in Quantum Sensing and Nano Electronics and Photonics XVII, M. Razeghi, J. S. Lewis, G. A. Khodaparast, and P. Khalili, eds. (SPIE, 2020), p. 84.

S. P. O'Connor, E. M. Gil, M. A. Keppler, M. O. Scully, and V. V. Yakovlev, "Kernel principle component analysis applied to Raman spectra to differentiate drugs administered to rabbit cornea in blind study," in Visualizing and Quantifying Drug Distribution in Tissue IV, C. L. Evans and K. F. Chan, eds. (SPIE, 2020), p. 6.

A. A. Balandin, V. A. Fonoberov, "Vibrational modes of nano-template viruses," J. Biomed. Nanotechnol. 1(1): 90-95 (2005).

J. N. Bixler, M. T. Cone, B.H Hokr, J.D. Mason, E. Figueroa, E. S. Fry, V. V. Yakovlev, and M. O Scully, "Utrasensitive detection of waste products in water using fluorescence emission cavity-enhanced spectroscopy," Proceedings of the National Academy of Sciences, vol. III, pp. 7208-7211 (2014).

MHV NSP9 antibody. Datasheet. 6 pages https://www.antibodies-online.com/antibody/233751/anti-MHV+NSP9+antibody/.

* cited by examiner

FIG. 3

FIG. 5A
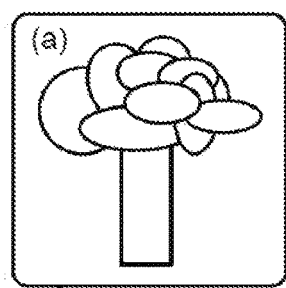
FIG. 5C
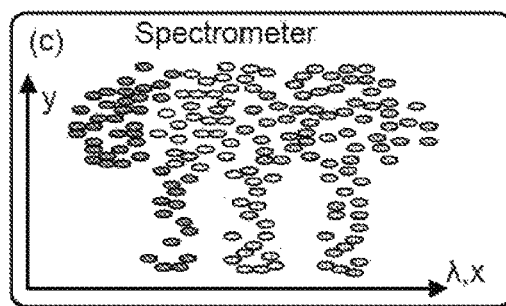
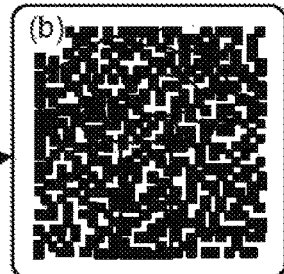
FIG. 5B
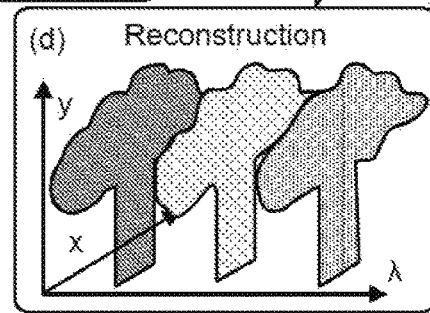
FIG. 5D

WIDE-FIELD DEEP UV RAMAN MICROSCOPE

CROSS REFERENCE TO RELATED APPLICATIONS

This application is a non-provisional application of and claims priority to U.S. Application Ser. No. 63/028,974, filed May 22, 2020, which is hereby incorporated by this reference in its entirety as if fully set forth herein.

ACKNOWLEDGEMENTS

This invention was made with government support under Grants DBI-1455671 awarded by the National Science Foundation (NSF) and FA9550-18-1-0141 awarded by the Air Force Office of Scientific Research (AFOSR). The government has certain rights in the invention.

FIELD OF THE INVENTION

This invention relates generally to system for generation, detection and imaging Raman signal, which carries chemical information about the sample of interest.

BACKGROUND

Deep ultraviolet (200-260 nm) Raman spectroscopy is known to provide high specificity and high sensitivity chemical sensing of biological molecules. This happens because of resonant Raman excitation which increases the signal by 5-6 orders of magnitude and is specific for organic molecules, including but not limited to biological molecules. Raman spectroscopy is based upon the interaction of light with the chemical bonds within a material and is commonly used in chemistry, biology and materials sciences to provide a structural fingerprint by which molecules can be identified quickly and/or distinguished from others. The Raman effect is based on the inelastic interaction between the electron cloud of a sample and the external electric field of the monochromatic light, which can create an induced dipole moment within the molecule based on its polarizability. Fluorescence is emitted at wavelength longer than 270 nm and does not interfere with Raman signal if the excitation wavelength is sufficiently short, i.e. shorter than 260 nm. The common issues limiting the widespread use of deep UV Raman spectroscopy are (1) the lack of proper light sources, (2) the lack of proper filters, which limits Raman spectrum only to high frequency vibrations and (3) the challenge in implementing it for microscopic imaging because UV light is potentially damaging to cells and tissues and needs to be significantly attenuated, which leads to extra-long acquisition times. Some of those challenges discussed in A. Shutov, G. I. Petrov, D. Wang, M. O. Scully, and V. V. Yakovlev, "Highly efficient tunable picosecond deep ultraviolet laser system for Raman spectroscopy," Optics Letters 44(23), 5760-5763 (2019). M. A. Troyanova-Wood, G. I. Petrov, and V. V. Yakovlev, "Simple and inexpensive instrument for deep-UV Raman spectroscopy," Journal of Raman Spectroscopy 44(12): 1789-1791 (2013), which are hereby incorporated by references as if fully set forth herein.

The COVID-19 pandemic took over the world in a matter of months. Fast spread of the virus was the result of multiple factors, including its long-term survival on open surfaces, like metals, where it was not immediately detected. While it has been shown that regular cleaning of infected areas serves the purpose of disinfection, it undervalues the other issue associated with virus spreading—its detection and isolation of infected areas and sources of infection. FIG. 1 illustrates inspection of surface for possible localization and identification of pathogens for control of infection. From food safety, which is widely believed to be the source of COVID-19 initial spread into human population, to safety of public areas, detection of viral particles, which can be potentially contagious and life threatening, is a challenging problem which humankind have to deal with for its survival.

Accordingly, detection, identification and, in a longer term, research on virus interaction with cells and drugs based on unique abilities of narrowband ultraviolet (UV) light to detect and image chemical and structural features associated with viruses is needed. Deep UV radiation (generally defined as radiation with wavelength shorter than 280 nm; UV-C) is known for disinfection; however, such light can be exceptionally suitable for remote sensing and chemical imaging and identification of viruses via Raman scattering. [1] [2] [3] [4]. However, issues have arisen such as the lack of proper light sources, lack of proper filters, and/or hurdles to implementation of microscopic imaging are addressed.

There is literature on using deep UV radiation for detection and identification of bacterial and viruses (see [8]); however, a known issues exists on the instrumentation side because all the commercial and home-made Raman spectroscopic systems operating in the deep UV are large in physical size due to the complexity of the laser system used as a light source. These devices are often prohibitively expensive. Adding imaging capability further amplifies the complexity making those systems impractical for widespread applications. Moreover, those systems typically limit the range of Raman frequencies to high-frequency vibrations, where specificity is significantly reduced due to non-specific bands related to proteins, nucleic acids and lipids. It would be highly desirable to detect and analyze lower vibrational frequency spectral range ($<1000$ cm$^{-1}$) [9] [10]; and this is not available through regular spectroscopic techniques. Surface Enhanced Raman Scattering (SERS) was employed for analysis of viruses in liquids [11] [12], such as blood serum and saliva; however, those substrates are difficult to implement for in situ analysis of surface contaminations and provide less signal enhancement and specificity than deep UV Raman spectroscopy.

SUMMARY OF THE DISCLOSURE

In accordance with the purpose(s) of this invention, as embodied and broadly described herein, this invention, in one aspect, relates to a spectroscopy device comprising an incoherent light source, tunable to a predetermined emission wavelength; a microscope platform comprising a microscope objective comprising a deep-UV optimized objective and a focal plane defined thereon; a notch filter having an absorption frequency matched to the emission wavelength; and a frequency-selective optical path from the wide-field UV light source to the microscope platform onto the focal plane and from the focal plane through the notch filter.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate (one) several embodiment(s) of the invention and together with the description, serve to explain the principles of the invention.

FIG. 3 is a schematic illustration of the structure of murine hepatitis virus (MHV) showing similarities with COVID-19.

FIGS. 5A-5D illustrate the concept of compressed Raman imaging.

DESCRIPTION OF ILLUSTRATED EMBODIMENTS

Figure 1:
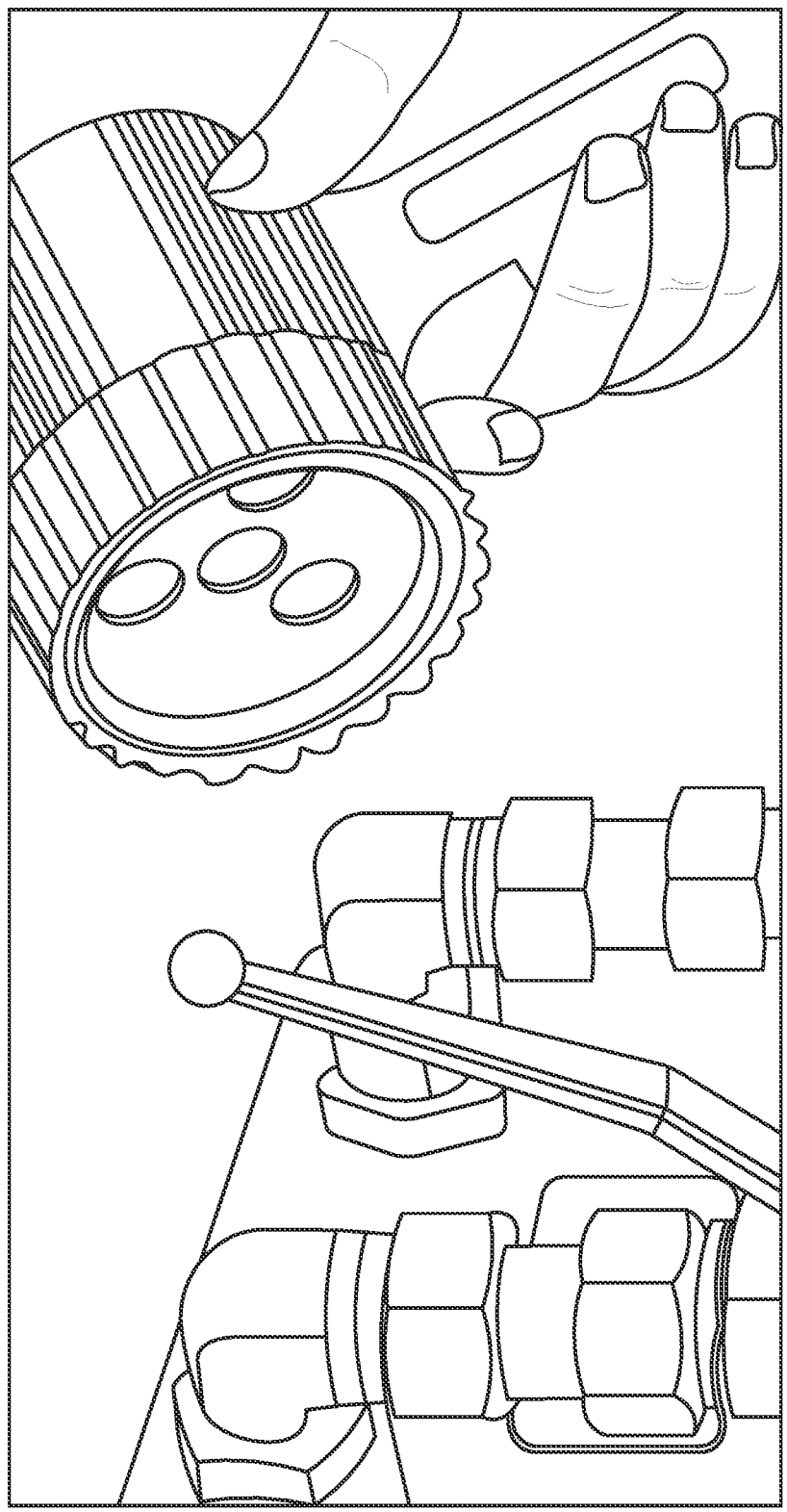
FIG. 1 illustrates inspection of surface for possible localization and identification of pathogens for control of infection.

The present invention may be understood more readily by reference to the following detailed description of embodiments of the invention and the examples included therein and to the Figures and their previous and following description.

Before the present compounds, compositions, articles, devices, and/or methods are disclosed and described, it is to be understood that this invention is not limited to specific synthetic methods, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Reference will now be made in detail to aspects of the present invention, examples of which are illustrated in the accompanying drawings. Wherever possible, the same reference numbers are used throughout the drawings to refer to the same or like parts.

Accordingly, a wide-field deep UV Raman microscope is provided and addresses problems in existing deep UV Raman spectroscopy. The presently-described device has various advantages, including being less expensive, environmentally stable, and with extended capabilities of UV Raman spectroscopy to low-frequency wavenumber range, which allows for sensing and recognition of viruses. Additional advantages offered by the presently-described systems and methods include higher resolution, higher specificity, higher sensitivity, and remote sensing, disinfection and/or chemical imaging, even from an extended range, are possible. Moreover, a laser source is not required and scanning is not needed.

Short-wavelength radiation offers several distinct advantages such as (1) increased scattering cross-section due to $\lambda^{-4}$ effect, which leads to a factor of 100 increase of Raman cross-section, and an electronic resonant transition resulting in another factor of $10^4$-$10^6$ in signal enhancement; (2) lack of fluorescence interference due to the fact that fluorescence comes at longer wavelengths, leading to the spectral region of Raman frequencies fluorescence-free; (3) improved specificity due to resonance enhancement with respect to many abundant inorganic molecules; (4) ability to perform measurements during the daytime and under room light. [5] [6] [7]. For the purposes of this explanation, inorganic molecules are referenced, although the invention and application are not limited in scope to inorganic molecules. The proposed microscope can be generally used for both organic and inorganic molecules. It is generally assumed that in the wavelength region from 200 nm to 300 nm absorption happens more likely through organic molecules.

According to principles described herein, a commercial high-resolution optical spectrometer, where the entrance slit and delivery optics are modified, is provided. According to principles described herein, an excitation source emitting light at in an appropriate wavelength is provided. For example, a light source emitting light within a range of about 180 nm to 1000 nm may be used as an excitation source. In other words, light sources in the ultraviolet, visible and infrared bands may be used. In an example in the UV light range, a low-pressure mercury lamp with the attached filter to select 253.7 nm emission wavelength may be used as the excitation source. By using a high-numerical aperture objective, this light can be focused in to 100-200 micron spot to generate Raman signal.

In addition, and as discussed in detail herein, a matched cell can be used to collect Raman emission. For example, if a mercury emission source is used, a heated mercury cell can be placed in the beam path to let the incident 253.7 nm radiation be absorbed by the heated mercury cell. As a result, Raman frequencies as low 10 $cm^{-1}$ can be detected. The compressed sensing arrangement allows for reconstructing the image at the focal plane, where for each point of the image a Raman spectrum is provided, using a computer algorithm.

According to principles described herein, a low-pressure atomic lamp, such as a mercury (Hg) lamp is used as an excitation source, replacing a laser source in conventional Raman systems. The exemplary Hg lamp provides monochromatic light at 253.7 nm at a power levels of 100's of microwatts power. Any atomic light source may be used, provided that it can produce monochromatic light in a wavelength range of 180 nm to 1000 nm.

Figure 2:
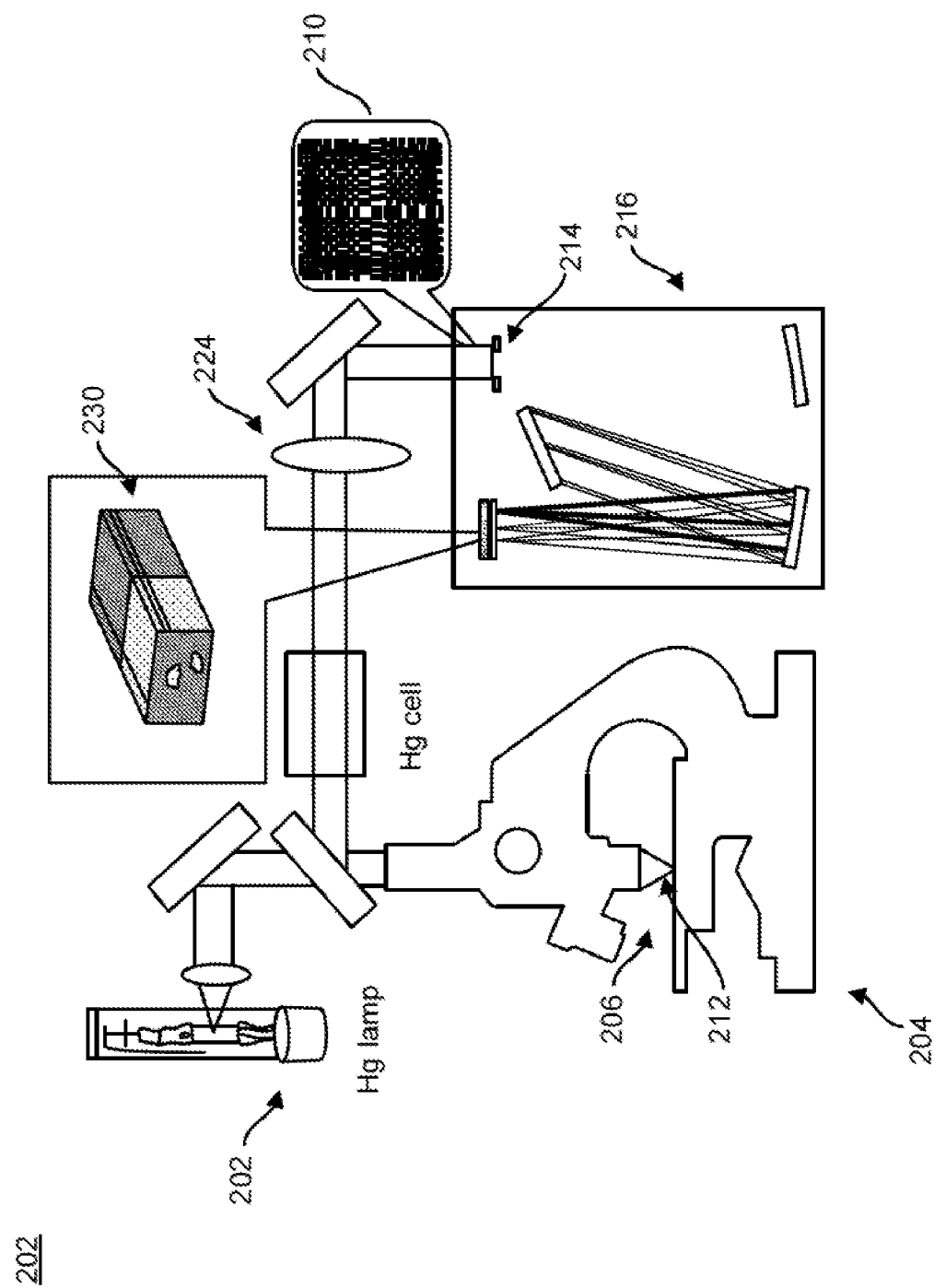
FIG. 2 shows a schematic diagram of an embodiment of the overall instrument according to principles described herein.

FIG. 2 shows a schematic diagram of an embodiment of the overall deep-UV instrument 200 according to principles described herein. As illustrated, an embodiment may include an emission source 202, such as a mercury (Hg) lamp as an excitation source, standard microscopic platform 204, where microscope objective is replaced with the deep-UV optimized objective 206, a notch filter 208, such as an Hg vapor cell, as a filter to separate transmitted Raman signal, and spatially modulated input mask 210 to reconstruct the hyperspectral Raman image without the loss of spatial and spectral resolution.

Such light source, however, generally cannot be focused into a diffraction limited spot due to its intrinsic incoherent properties. Instead, the light source can be directed into an area of about 50-100 µm in diameter, for subsequent wide-field imaging. For this, a focal plane 212 of a microscope objective may be imaged on a structured entrance slit 214 of an imaging spectrometer 216.

Using an approach of compressed sensing imaging, the hyperspectral image (i.e., Raman spectrum at each location of the illuminated area) may be retrieved using a computational algorithm. A heated Hg cell 208, matched to absorb light at 253.7 nm, may be used as an ultra-narrow notch filter to remove the elastically scattered light from the spectra. A Hg cell 208 is chosen because it matches well with the emission frequency of the Hg lamp 202. If a different emission source 208 is used, a cell material should be chosen to match the emission frequency of the emission source. For example, if a Tellurium lamp is used as the emission source 202, a matched Tellurium cell, or other suitable material, could be used as the narrow filter 208 to filter out the emission wavelengths.

Accordingly, multiple advantages that are not available in any other Raman microscopy imaging may be achieved, including, but not limited to: (1) improved spatial resolution, which is expected to be $\lambda/2 \cong 130$ nm, comparable to the size of a typical coronavirus, i.e. allowing spatial localization of viruses; (2) improved specificity, since the vibrational spectral range is expanded to the spectral region of 10-1800 $cm^{-1}$, which is not known to have been accomplished in wet biological samples due to a significant interference from the low-frequency vibrations of water molecules; (3) wide-field imaging, which improves the data acquisition time, for example, by more than a factor of 1000; (4) reduction of the cost and complexity of the system (no laser and no precise alignment needed, which is the case of implementing this system in BSL-2 and, potentially, BSL-3 and BSL-4 labs).

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

EXAMPLES

In an example configuration an ordinary mercury lamp may be used as a light source for high-resolution Raman imaging. High spatial resolution is provided by the imaging system itself as is defined by the numerical aperture of the focusing lens (e.g., NA=0.8) and excitation wavelength (e.g., ~254 nm) to achieve approximately ~120 nm spatial resolution. The use of a narrow band stable or ultra-stable (in terms of wavelength) light source and stable or ultra-stable notch filter in the form of absorption filter allows filtering Raman spectra with a high degree of fidelity. The use of deep UV excitation allows resonant excitation of biological molecules, which further improves specificity of imaging and enhances sensitivity by 5-6 orders of magnitude. Simultaneous imaging from a large area makes it possible to reduce the acquisition time by 25,000 times (assuming a moderate 200-nm spatial resolution and 100×100 micron field of view.) Low frequency Raman spectra of biological molecules in their natural environment can be recorded in accordance with principles described herein.

Figure 3:
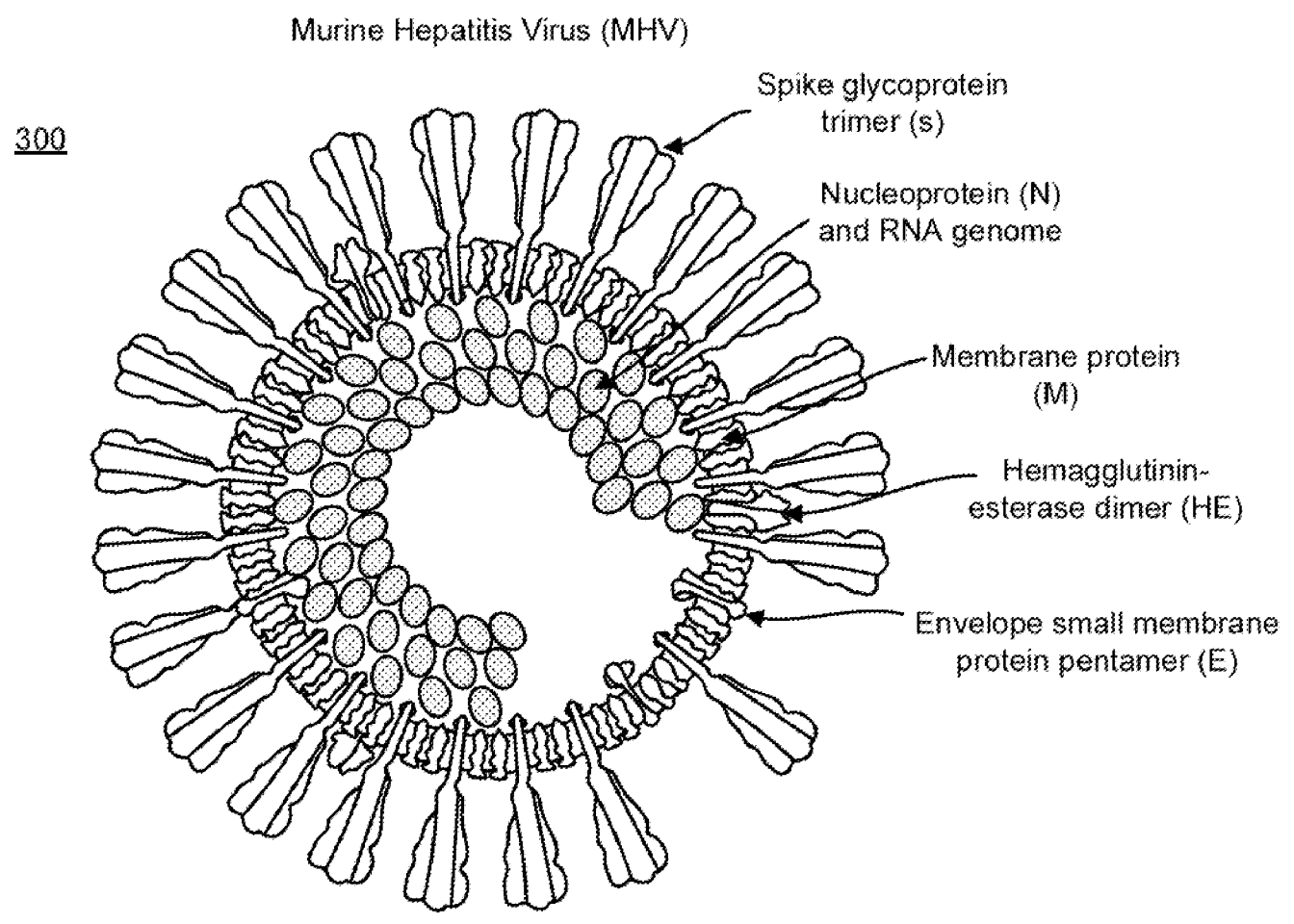

For the purposes of example, without limitation, a model system 300 of murine hepatitis virus (MHV), which belongs to the family of coronaviruses and whose structure (see FIG. 3) resembles the structure of COVID-19, SARS, and MERS viruses, may be used to model use of a device according to principles described herein. MHV-1 being injected in mice, causes similar respiratory symptoms as COVID-19 in humans. FIG. 3 is a schematic illustration of the structure of murine hepatitis virus (MHV) showing similarities with COVID-19. Fluorescently labeled antibodies for MHV-1 are commercially available and can be used for visualization and detection.

A Deep UV Raman Spectroscopic Sensing System

Figure 4:
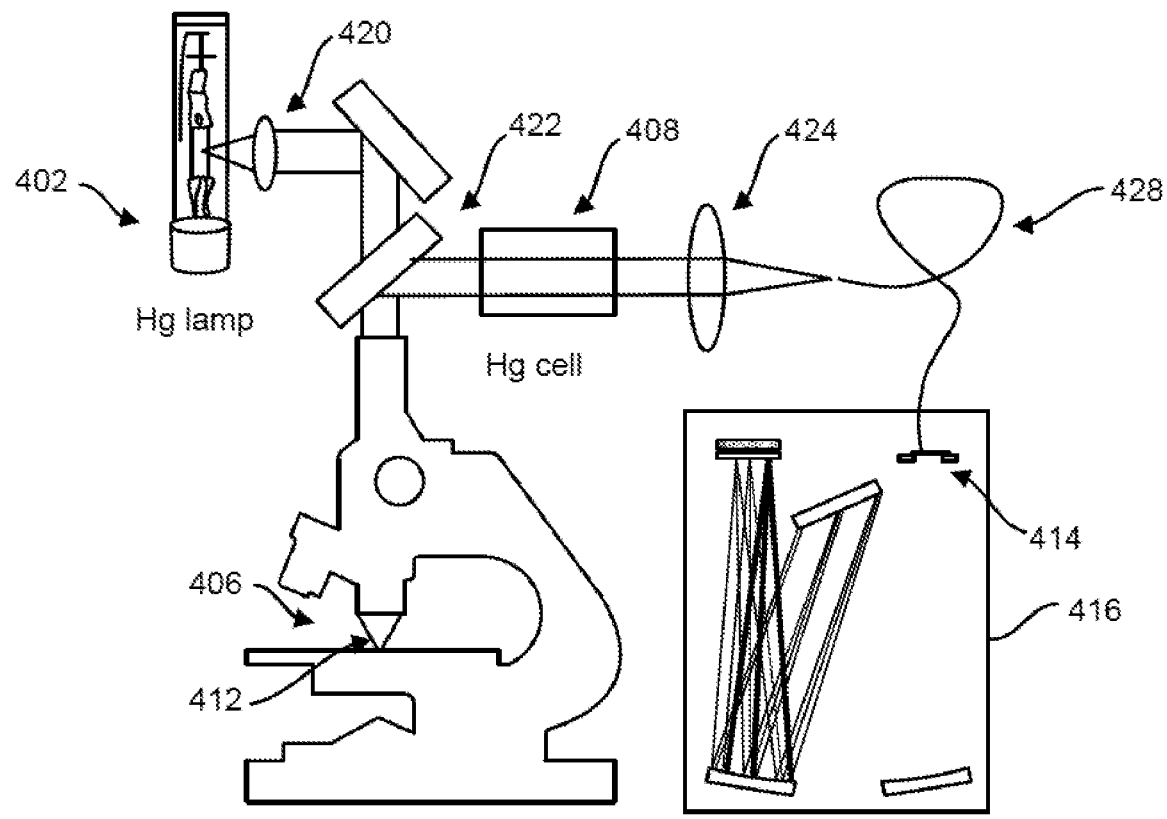
FIG. 4 shows an example configuration of deep UV Raman system to perform spectroscopy in the extended range of vibrational frequencies.

An example configuration of deep UV Raman system 400 to perform spectroscopy in the extended range of vibrational frequencies is shown in FIG. 4. A fiber coupled Hg lamp (e.g., by StellarNet, Inc.) is shown as a light source 402, and a Mercury line filter (e.g., MaxLamp™ by Semrock, Inc. with over 65% transmission) (not shown) may be used to select a single emission line centered at 253.7 nm. A different emission line of Mercury, such as 184.45, 365.4, 404.7, 435.8, 546.1, 578.2, and 650 nm, may be chosen in lieu of the 253.7 nm line, provided the absorption filter or cell 408 is matched to the emission line, as described herein.

Several naturally existing isotopes of Hg provide an emission line of about 1 $cm^{-1}$. This radiation will be collimated with a fused silica lens (e.g., by ThorLabs, Inc.) 420 and directed to a deep UV microscope infinity-corrected objective 406 (e.g., LMU-40X-UVB (NA=0.49, 40×), by ThorLabs, Inc. The deep UV microscope infinity-corrected objective 406 may be replaced by Nikon CFI super fluor objective (NA=0.90, 40×; MRF00400, Nikon, Inc.), which offers almost a factor of 4 higher collection power and twice better spatial resolution, and potentially, better imaging.

The sample may be positioned at the focal plane 412 of the objective 406. A spot size of 50 µm, which corresponds to the overall intensity of $7 \cdot 10^{-2}$ µW/µm² after considering transmission of optical components and the emission of the lamp 402, may be used. This is considered as safe level of live cell operation at this wavelength even for the live cells. If more UV power is needed, an electrodeless low-pressure Hg lamp (e.g., by Opthos Instruments Co., LLC) or other device may be used to deliver higher power, e.g., at least 100 times power in a narrow-line 253.7 nm emission.

Raman signal is collected in the backscattered geometry 422, and, through a beam-splitter, directed to a 75-mm-long heated fused silica Hg vapor cell 408 (e.g., Opthos Instruments Co., LLC). Such vapor cell 408 provides a notch absorbing filter. For a naturally occurring mixture of Hg isotopes, the bandwidth at full-width-half-maximum (FWHM) is expected to be 1 $cm^{-1}$, and the optical density at 50° C. is expected to be greater than 5, better than any existing commercial filter in this wavelength range (see, for example, Semrock, Inc.). After the vapor filter 408, a fused silica lens 424 may be used to image the collected Raman signal into a fused silica fiber bundle 428 (e.g., by Leoni Fiber Optics, Inc.), connected to a spectrometer 416 (e.g., by Andor Tech, Inc. or Horiba, Inc.). For example, a ⅓-meter spectrometer and ½-meter spectrometer may be equipped with deep-UV optimized 3600 grooves/mm and 2400 grooves/mm gratings, respectively. Both the liquid-nitrogen (e.g., by Horiba, Inc.) and thermoelectrically (e.g., by Andor Tech, Inc.) cooled CCD 430 optimized for improved detection efficiency below 300-nm are available.

The system may be tested using as a first sample, double distilled water. Earlier, with 237 nm laser excitation [13] [6], we saturated the CCD detector (65,000 counts @3300 cm$^{-1}$) in 50-ms with just 1 mW power directed to the microscope objective. This will provide a reference point to test the efficiency of Raman excitation using incoherent light source as compared to the laser source and the modified detection.

To test the capability of a detection system according to principles described herein to assess low-frequency Raman spectra, a powdered sample of lysozyme powder (e.g., Sigma-Aldrich, Inc.) may be used, which is a known protein abundant in egg white and which also serves as a part of immune system. A deep UV Raman spectrum may be recorded from lysozyme in the spectral range from −400 cm$^{-1}$ (anti-Stokes band) to +1800 cm$^{-1}$ and compared with the visible (low- and high-frequency) and deep UV (high-frequency) Raman spectra. Those measurements may be repeated for an extended period of time to evaluate the stability of a protein upon deep-UV exposure. If long-term degradation of spectra is noticed, the incident power of deep UV radiation may be reduced to ensure long term stability of those measurements.

Finally, the system may be used to observe a coronavirus, MHV-1 (ATCC® VR-261™; ATCC, Inc.) on a disinfected aluminum surface and record its deep UV Raman spectrum from −400 cm$^{-1}$ to +1800 cm$^{-1}$. Those spectra may be recorded at different locations and stored in the library for future reference.

Deep UV Raman Spectroscopic Imaging System

FIGS. 5A-5D illustrate the concept of compressed Raman imaging. The Raman signal from an object (FIG. 5A) is spatially encoded with a pseudo-random binary mask. (FIG. 5B) Spatially encoded object is imaged by a spectrometer (FIG. 5C), which performs a spatial shearing on the image based upon spectral content. A reconstruction algorithm uses the encoding mask to recover a hyperspectral image of the original object (FIG. 5D).

To provide an imaging system according to principles described herein, the optical fiber, which delivers Raman signal from the sample to the entrance slit of the spectrometer, may be replaced with an imaging system, which will transfer the focal plane of the microscope objective onto the wide-open slit of an imaging spectrometer keeping the rest of the optics in place. Earlier, we have demonstrated that by manipulating with the spatially modulated output of the spectrometer in V. Thompson, J. N. Bixler, B. H. Hokr, G. D. Noojin, M. O. Scully, and V. V. Yakovlev, "Single-shot chemical detection and identification with compressed hyperspectral Raman imaging," Opt. Lett. 42, 2169-2172 (2017), [14], which is hereby incorporated for all purposes as if fully set forth herein. As described in M. A. Keppler, E. M. Gil, S. P. O'Connor, G. D. Noojin, V. V. Yakovlev, and J. N. Bixler, "Compressed hyperspectral Raman microscope for imaging tissues and cellular structures," in *Optical Interactions with Tissue and Cells XXXI*, B. L. Ibey and N. Linz, eds. (SPIE, 2020), p. 22, [15], which is hereby incorporated by references for all purposes as if fully set forth herein, both the spatial and spectral information of the image can be retrieved using a compressed sensing algorithm described therein and recently further (see FIG. 5). Conceptually, the compressed sensing algorithm may bear some similarity to a more established Hadamard spectroscopy [16] [17], but the compressed sensing methods developed by us allow flexibility in choosing spatially encoded pattern, which can be placed either at the entrance plane of the imaging spectrometer or at the conjugated imaging plane.

Most CCD detectors, which are used in an image acquisition mode, may have very slow readout. If higher readout rate is used, the readout noise may become unacceptable. The CCD (e.g., 230, 430), which also has large pixel size (~14-23 μm) may be used or may be replaced with a sCMOS detector (e.g., by Dhyana 400BSI V2, Tucsen, Inc.), which has smaller pixel size (6.5 μm), low readout noise (1.2 e/pixel) and low thermal noise $$(0.1 \frac{e}{\text{pixel sec}}),$$

allowing acquiring full frame as fast as 74 frames per second.

With the imaging system designed to provide 200× magnification, 50 μm×50 μm focal area may be imaged onto that 10 mm×10 mm area on the slit (e.g., 214, 414), which allows to images on top of each other for simultaneous recording of, say, two orthogonal polarizations of the Raman signal. A pixel of the sCMOS may correspond to the area of 32 nm×32 nm at the focal plane. This procedure may be used to acquire hyperspectral images. The example digital mirror device (DMD, e.g., by Texas Instruments, DLP Lightcrafter) used for the purposes of illustrating an example of an embodiment of a system according to principles described herein is made out of aluminum coated mirrors, which are suitable for deep UV operation. The pixel size of the DMD is comparable to the pixel size of the sCMOS,(i.e., a routine 1:1 imaging system may be needed to reimage the surface of the DMD onto the entrance plane of the imaging spectrometer). In an example, a ½-meter spectrometer (e.g., by Horiba, Inc.) may be used, since it results in lower aberrations as compared to ⅓-meter spectrometer. In the future, we plan to upgrade it to 1-meter spectrometer, where those aberrations become insignificant, while the spectral resolution can be improved by a factor of 2.

In this example, a lysozyme powder may be used first and sparsely distributed on the surface (Al mirror or CaF$_2$ substrate). Lysozyme microcrystals are typically of a μm size and can be seen under microscope. Knowing the Raman spectrum of lysozyme, the retrieval algorithm may be adjusted to reproduce those Raman spectral collected earlier, while imaging the shape of those crystals with maximum sharpness (spatial resolution).

Next, MHV-1 labelled with fluorescently marked antibodies (see, for example, https://www.antibodies-online.com/antibody/233751/anti-MHV+NSP9+antibody/) may be dispersed on a substrate. While being less efficient, fluorescence can be excited in the UV and imaged using the same setup. This way, MHV-1 can be localized on the surface and confirm the imaging using Raman imaging by referring to MHV-1 deep-UV Raman spectra collected earlier.

Virus Imaging in Complex Biological Environment

The system described above may be applied to image a single layer of cells with infected MHV-1 virus (or other particles), and those cells may be placed under microscope on a $CaF_2$ substrate to be imaged with a new instrument. At first, deep UV Raman hyperspectral images of those cells may be recorded to be able to distinguish Raman spectra of cells and viruses. We believe that this is where low-frequency Raman imaging capabilities can be found extremely valuable, since viral assemblies possess stronger low-frequency features than other components of cells inside a cytoplasm. Deep learning algorithms [18] [19] [20] may be used to image the distribution and dynamics of viruses in living cells.

According to principles described herein, a system and method to detect, identify and image pathogens on open surfaces is provided. The capabilities of the presently-described system allows for studying the structure and function of viruses and to fundamentally understanding the mechanisms of infection and potential treatment. Other applications include but not limited to forensics analysis, homeland security and non-invasive pathological imaging with enhanced spatial resolution and informational content. While described herein as employing ultraviolet light, other light wavelengths may be used in place of UV light, such an infrared or visible light, without departing from the spirit and the scope of the invention described herein.

The topic of viral sensing and imaging, homeland security and biomedical imaging has great public resonance and offers an extraordinary opportunity for research projects to connect to the public. The economic practicalities of relatively inexpensive optical tools environmental health and safety concerns have been resultant hot-button issues arising in the media.

Raman spectroscopy is commonly used for industrial process monitoring, for non-invasive chemical and biological imaging and for a number of bioanalytical applications, including pathogen detection and forensics. Using deep UV Raman can be quickly done using normal, room-light environment with enhanced spatial resolution, sensitivity, specificity and enhanced capabilities.

Traditional Raman spectroscopy is widely used. The proposed approach is not only less expensive, since laser will be replaced with a commonly used low-pressure mercury lamp, but will also be environmentally stable (no nanoscopic scanning is needed), more user friendly (no need of precise alignment of the laser into microscope and no need to turn room lights for taking measurements), and more sensitive and chemically specific (for example, deep UV resonant Raman spectroscopy potentially allows at least a factor of about 1000 improvement in detection sensitivity compared to a normal Raman spectroscopy).

Moreover, 120-nm spatial resolution is not known to be possible with traditional Raman spectroscopy. Sensitivity and specificity is, at least, 3 orders of magnitude better than traditional Raman spectroscopy. Extended spectral range of vibrational modes towards low frequencies is not known to be possible with traditional Raman spectroscopy in natural biological environment due to a significant background from water.

Individual components described herein may be selected to optimize for the signal strength, spectral resolution of Raman spectra and spatial resolution of imaging without departing from the spirit and scope of the invention described herein. Deep-UV Raman imaging, which can lead both to superior research tool to study pathogens interactions with living cells and to a powerful instrument to detect, image and identify those pathogens in situ.

Accordingly, a novel instrument, which can serve the purpose of microbiological and broader biomedical communities, including providing spectroscopic capabilities, imaging capabilities, small particle and virus detection and imaging, such as coronaviruses is described herein.

Various prototypes of a Raman imaging device according to principles described herein has been built and demonstrated, as described below.

Demonstrated Use of Mercury Cell as an Efficient Narrow-Band Filter

Figure 6A:
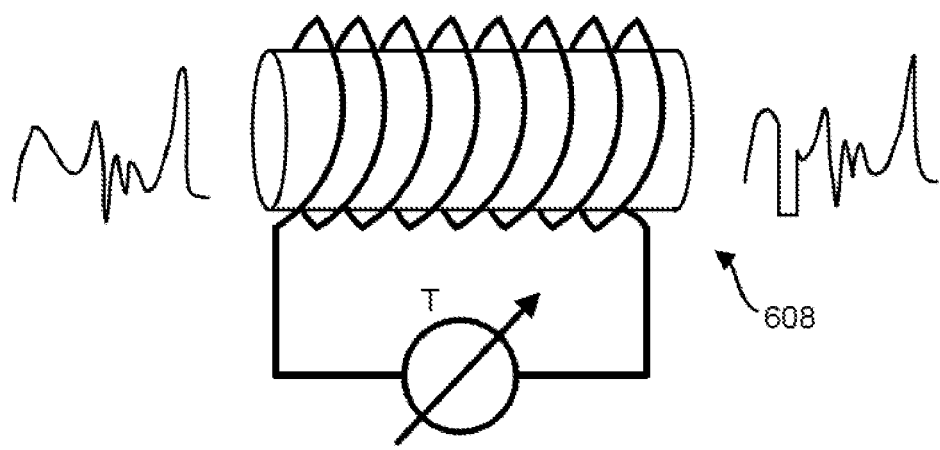
FIG. 6A illustrates a temperature controlled vapor cell.

In a prototype of a system for Deep-UV Raman imaging according to principles described herein, a quartz cell filled with mercury 608 (diameter 25 mm, pathlength 75 mm) was purchased from Opthos Instrument Company and was placed in a home-built oven to control the pressure of mercury (Hg) in the cell 608 (FIG. 6A). FIG. 6A illustrates a temperature controlled vapor cell 608 that serves as a narrow-band notch filter to selectively absorb light at the atomic transition (253.7 nm) of Hg.

Figure 6B:
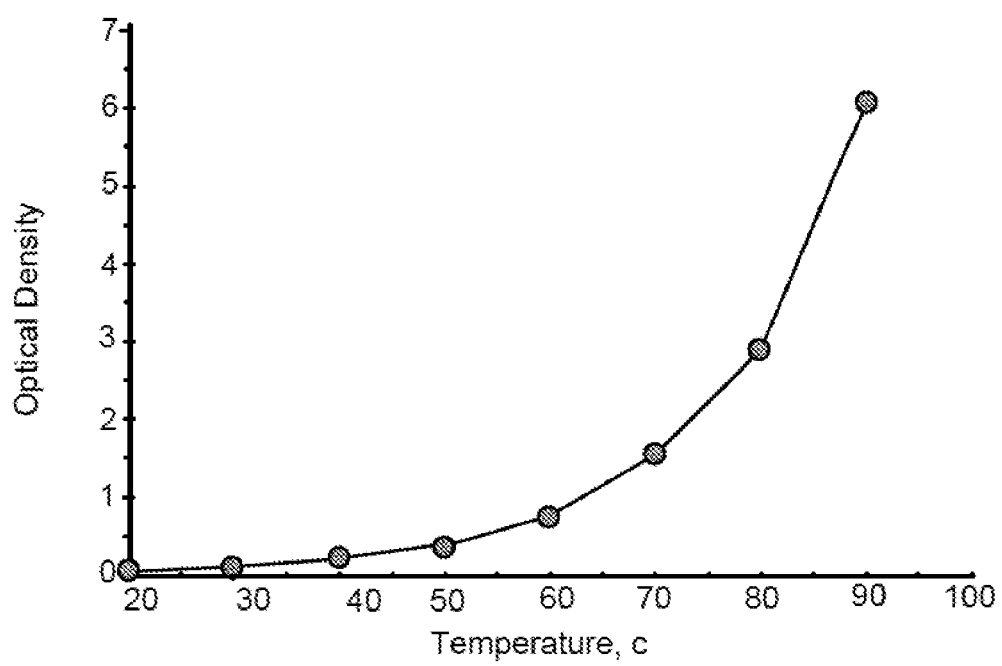
FIG. 6B shows the measured optical density of the cell as a function of temperature.

The transmission of 253.7 nm of the Hg emission line was measured as a function of temperature, and the optical density was evaluated as a function of the cell's temperature (FIG. 6B). FIG. 6B shows the measured optical density of the cell 608 as a function of temperature. Above temperature of about 85° C., the optical density exceeds 4, and routine low-frequency Raman measurements become possible near the Rayleigh line. At temperatures above 85° C., the attenuation of the emission line of Hg at 253.7 nm exceed 10,000 making low-frequency (<500 $cm^{-1}$) Raman measurements possible with 253.7 nm excitation.

Demonstrated Efficient Fluorescence Background Rejection Using Deep UV Excitation Organic samples often exhibit fluorescence background that can mask Raman signal. In a particular example, which was motivated by application of Raman spectroscopy for non-destructive forensic analysis, a sample of commercial carpet was analyzed. A commercial Raman microscope (LabRAM; Horiba, Inc.) equipped with 660-nm excitation wavelength laser source was used for comparison.

Figure 7:
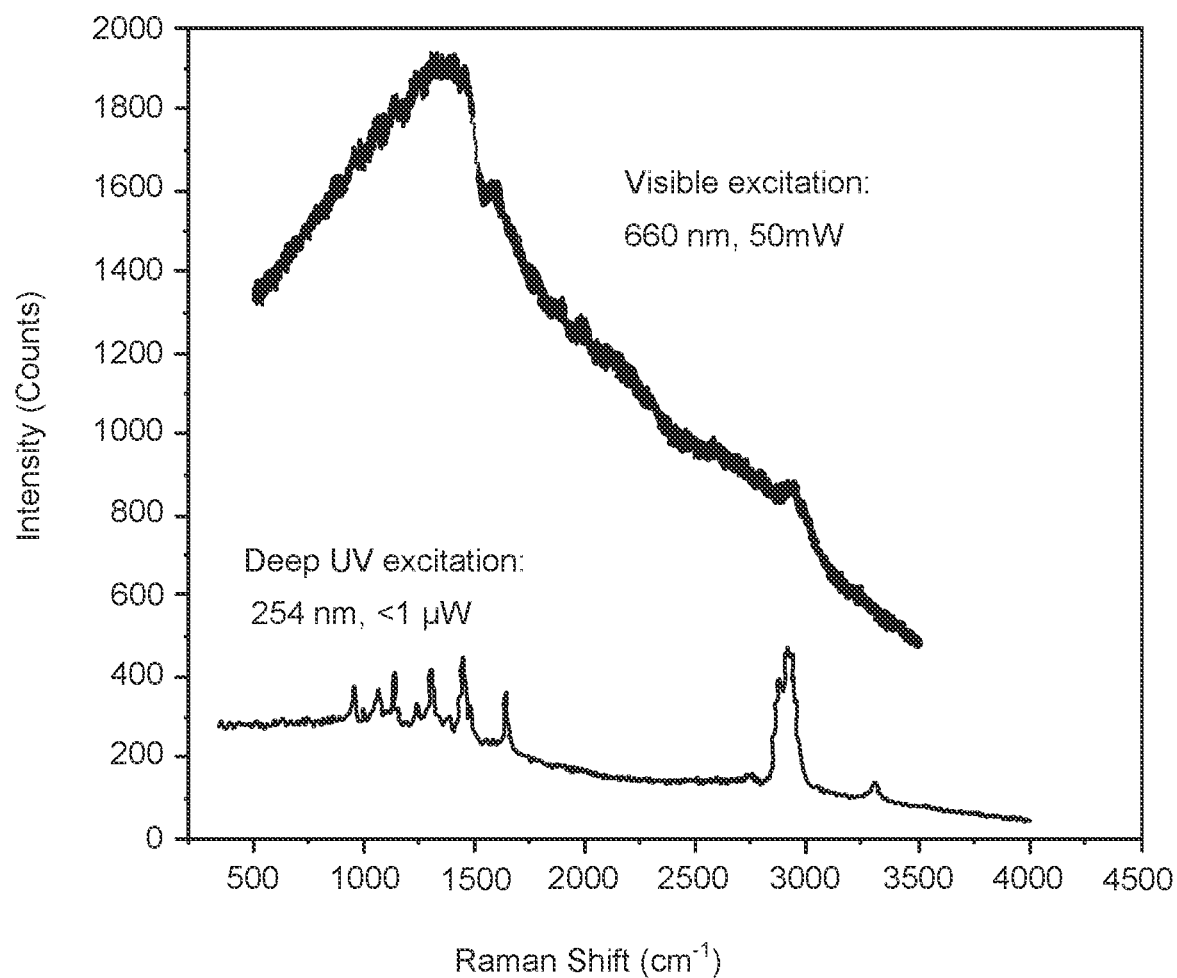
FIG. 7 is a plot of Raman shift vs. Intensity for deep-UV excitation and visible excitation.

Referring to FIG. 7, Raman spectrum excited by the deep UV excitation (FIG. 7, lower plot) shows negligible autofluorescence background as compared to the one excited by the visible light (660 nm; upper plot curve). With 50-mW of laser power focused onto carpet fibers, the detected signal is dominated by an autofluorescence background (FIG. 7; upper plot). With as little as 1 microwatt of power of 254 nm excitation, Raman spectrum of fibers is clearly seen with very little background present in the spectrum. The acquisition times are: 1-s for the visible light and 10-s for the deep-UV light excitation. Both spectra are shown on the same intensity scale exhibiting a much stronger efficiency of light conversion into Raman signal for short-wavelength excitation.

Demonstrated Efficient Low-Frequency Raman Detection

Figure 8:
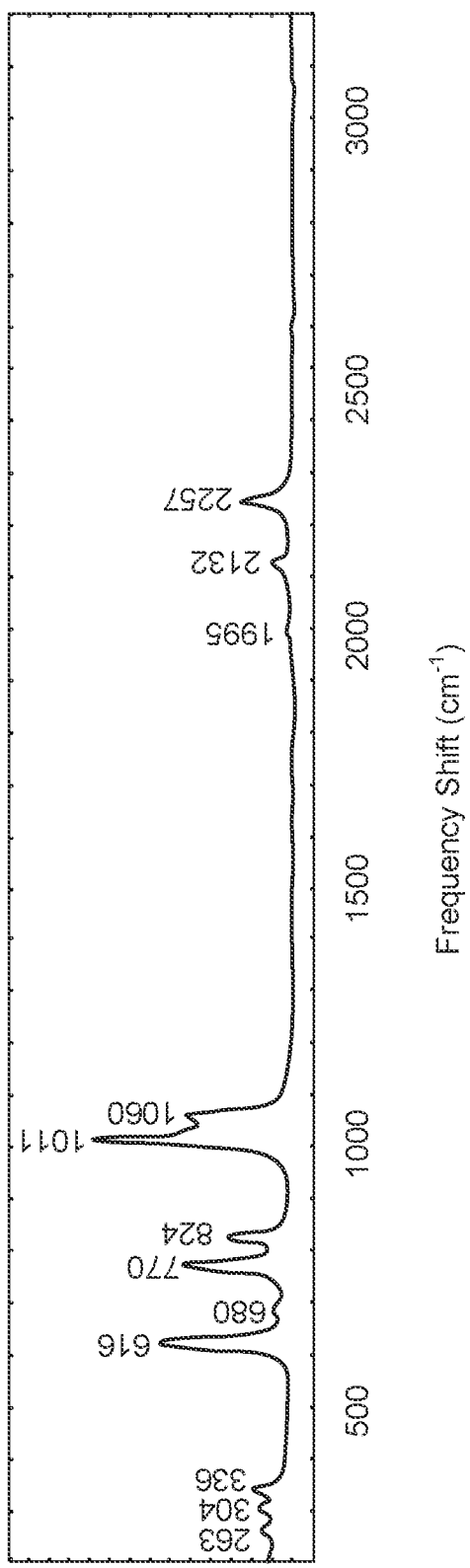
FIG. 8 shows Raman spectrum for DMSO-d6 exhibiting low frequency ($<cm^{-1}$) vibrations at an excitation wavelength of 253.7 nm.

Most of the earlier reported deep UV Raman spectroscopy measurements [24] were intrinsically limited by the availability of sharp-edge Raman filters to efficiently cut the Rayleigh scattering line. For example, Semrock, Inc. provides a family of edge/long-pass filters for Raman spectroscopy; however, for the deep UV excitation, transmission starts at around 500 cm$^{-1}$. We used an absorption line Raman filter based on Hg-vapor absorption cell and recorded a Raman spectrum of deuterated dimethyl sulfoxide (DMSO-d6; Sigma-Aldrich, Inc.) using 253.7 nm excitation line of Hg (see FIG. 8). FIG. 8 shows Raman spectrum for DMSO-d6 exhibiting low-frequency (<500 cm$^{-1}$) vibrations. Excitation wavelength: 253.7 nm.

The acquisition time was set to 100-s to improve the signal-to-noise ratio. Raman lines in the spectral range of 200-300 cm$^{-1}$ are clearly seen. The temperature of Hg vapor cell was set to about 75° C. providing a factor of 300 attenuation of the incident radiation.

Potential Applications of Deep-UV Raman Sensing and Imaging

Agriculture provides an untapped opportunity for Raman sensing and imaging. For example, analysis of chemical composition of soils is essential for understanding soil erosion and evaluating necessity for additional nutrients and treatment [25]. Traditional Raman spectroscopy utilizing visible light excitation is hardly applicable since the signal is dominated by a strong autofluorescence background; however, deep UV Raman spectroscopy, as demonstrated in FIG. 7 can substantially reduce such background providing clear spectral features. Near-IR excitation can also reduce the background, but separation of organic and inorganic content of soil is often needed. Organic molecules provide a substantial enhancement of Raman signal when excited in the deep-UV spectral region, which allows better understand the chemical composition of soils and reduce the signal from a more abundant inorganic matter. Similar problems exist in biopsy analysis of some cancers, such as bone cancers. Inorganic matrix of bone (apatite) provides a strong Raman signal, which typically masks a weaker Raman signal from protein molecules, which carry the information about disease. Non-resonant excitation using visible or near-IR light predominantly produces Raman signal from inorganic, non-specific content, which is present at much higher concentrations. Deep-UV Raman excitation has been shown to selective enhance signal from organic matter [26], which is critically important for chemical contrast enhancement. Finally, in forensic science, detecting gunpowder residues is critically important. However, the use of visible or near-IR laser light focused into a small spot-size for efficient detection of Raman signal is prohibited, since 10 mW laser power focused into a 1-mm-diameter spot produces the peak power in the focus of the order of $10^6$ W/cm$^2$ sufficient to denotate the gunpowder. Deep UV Raman excitation allows spectral measurements (see FIG. 7) with 10,000× less power used at the sample providing a safer way to perform such measurements.

Throughout this application, various publications are referenced. The disclosures of these publications in their entireties are hereby incorporated by reference into this application in order to more fully describe the state of the art to which this invention pertains.

REFERENCES

1. S. A. Asher, "UV resonance Raman spectroscopy for analytical, physical, and biophysical chemistry. 1," Analytical Chemistry 65, A59-A66 (1993).

2. Q. Wu, T. Hamilton, W. H. Nelson, S. Elliott, J. F. Sperry, and M. Wu, "UV Raman spectral intensities of *E. coli* and other bacteria excited at 228.9, 244.0, and 248.2 nm," Anal. Chem. 73, 3432-3440 (2001).

3. Z. Q. Wen and G. J. Thomas, "UV resonance Raman spectroscopy of DNA and protein constituents of viruses: Assignments and cross sections for excitations at 257, 244, 238, and 229 nm," Biopolymers 45, 247-256 (1998).

4. J. M. Benevides, S. A. Overman, and G. J. Thomas, "Raman, polarized Raman and ultraviolet resonance Raman spectroscopy of nucleic acids and their complexes," J. Raman Spectrosc. 36, 279-299 (2005).

5. M. Troyanova-Wood, G. I. Petrov, and V. V. Yakovlev, "Deep-ultraviolet resonance Raman spectroscopy for chemical sensing," Optical Diagnostics and Sensing Xiii: Toward Point-of-Care Diagnostics 8591, (2013).

6. M. A. Troyanova-Wood, G. I. Petrov, and V. V. Yakovlev, "Simple and inexpensive instrument for deep-UV Raman spectroscopy," J. Raman Spectrosc. 44, 1789-1791 (2013).

7. A. D. Shutov, G. V. Petrov, D.-W. Wang, M. O. Scully, and V. V. Yakovlev, "Highly efficient tunable picosecond deep ultraviolet laser system for Raman spectroscopy," Opt. Lett. 44, 5760 (2019).

8. G. J. Thomas, "New structural insights from Raman Spectroscopy of proteins and their assemblies," Biopolymers 67, 214-225 (2002).

9. M. Talati and P. K. Jha, "Acoustic phonon quantization and low-frequency Raman spectra of spherical viruses," Phys. Rev. E 73, 6 (2006).

10. S. Sirotkin, A. Mermet, M. Bergoin, V. Ward, and J. L. Van Etten, "Viruses as nanoparticles: Structure versus collective dynamics," Phys. Rev. E 90, (2014).

11. J. D. Driskell, K. M. Kwarta, R. J. Lipert, M. D. Porter, J. D. Neill, and J. F. Ridpath, "Low-level detection of viral pathogens by a surface-enhanced Raman scattering based immunoassay," Anal. Chem. 77, 6147-6154 (2005).

12. S. Shanmukh, L. Jones, J. Driskell, Y. Zhao, R. Dluhy, and R. A. Tripp, "Rapid and sensitive detection of respiratory virus molecular signatures using a silver nanorod array SERS substrate," Nano Lett. 6, 2630-2636 (2006).

13. M. Troyanova-Wood, G. I. Petrov, and V. V. Yakovlev, "Deep-ultraviolet resonance Raman spectroscopy for chemical sensing," in *Optical Diagnostics and Sensing Xiii: Toward Point-of-Care Diagnostics*, G. L. Cote, ed., Proceedings of SPIE (Spie-Int Soc Optical Engineering, 2013), Vol. 8591.

14. J. V. Thompson, J. N. Bixler, B. H. Hokr, G. D. Noojin, M. O. Scully, and V. V. Yakovlev, "Single-shot chemical detection and identification with compressed hyperspectral Raman imaging," Opt. Lett. 42, 2169-2172 (2017).

15. M. A. Keppler, E. M. Gil, S. P. O'Connor, G. D. Noojin, V. V. Yakovlev, and J. N. Bixler, "Compressed hyperspectral Raman microscope for imaging tissues and cellular structures," in *Optical Interactions with Tissue and Cells XXXI*, B. L. Ibey and N. Linz, eds. (SPIE, 2020), p. 22.

16. S. T. McCain, M. E. Gehm, Y. Wang, N. P. Pitsianis, and D. J. Brady, "Coded aperture Raman spectroscopy for quantitative measurements of ethanol in a tissue phantom," Applied Spectroscopy 60, 663-671 (2006).

17. D. J. Lum, S. H. Knarr, and J. C. Howell, "Fast Hadamard transforms for compressive sensing of joint systems: measurement of a 3.2 million-dimensional bi-photon probability distribution," Opt. Express 23, 27636-27649 (2015).

18. E. M. Gil, M. A. Keppler, V. V. Yakovlev, A. Boretsky, and J. N. Bixler, "Comparison of various neural network-based models for retinal lesion analysis," in *Optical Interactions with Tissue and Cells Xxx*, H. T. Beier and B. L. Ibey, eds., Proceedings of SPIE (Spie-Int Soc Optical Engineering, 2019), Vol. 10876.

19. C. B. Marble, X. Xu, M. A. Keppler, E. M. Gil, G. I. Petrov, D. Wang, and V. V. Yakovlev, "Hyper-Raman optical activity of biologically relevant chiral molecules," in *Quantum Sensing and Nano Electronics and Photonics XVII*, M. Razeghi, J. S. Lewis, G. A. Khodaparast, and P. Khalili, eds. (SPIE, 2020), p. 84.

20. S. P. O'Connor, E. M. Gil, M. A. Keppler, M. O. Scully, and V. V. Yakovlev, "Kernel principle component analysis applied to Raman spectra to differentiate drugs administered to rabbit cornea in blind study," in *Visualizing and Quantifying Drug Distribution in Tissue IV*, C. L. Evans and K. F. Chan, eds. (SPIE, 2020), p. 6.

21. A. A. Balandin, V. A. Fonoberov, "Vibrational modes of nano-template viruses," J. Biomed. Nanotechnol. 1(1): 90-95 (2005).

22. J. N. Bixler, M. T. Cone, B. H Hokr, J. D. Mason, E. Figueroa, E. S. Fry, V. V. Yakovlev, and M. O Scully, "Utrasensitive detection of waste products in water using fluorescence emission cavity-enhanced spectroscopy," *Proceedings of the National Academy of Sciences*, vol. 111, pp. 7208-7211 (2014).

23. U.S. Pat. No. 9,927,417; High-Reflectivity Integrating Cavity and Optical Amplification; Issued Mar. 27, 2018.

24. R. S. Jakubek, J. Handen, S. E. White et al., "Ultraviolet resonance Raman spectroscopic markers for protein structure and dynamics," Trac-Trends in Analytical Chemistry, 103, 223-229 (2018).

25. S. J. Parikh, K. W. Goyne, A. J. Margenot et al., [Soil Chemical Insights Provided through Vibrational Spectroscopy] Elsevier, (2014).

26. J. W. Ager, R. K. Nalla, G. Balooch et al., "On the Increasing Fragility of Human Teeth With Age: A Deep-UV Resonance Raman Study," Journal of Bone and Mineral Research, 21(12), 1879-1887 (2006).

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A device, comprising:
   an incoherent light source;
   a line filter tuned to an emission wavelength at a single emission line of about 1 $cm^{-1}$;
   a microscope platform comprising a microscope objective comprising a deep-UV optimized objective and a focal plane defined thereon;
   a notch filter having an absorption frequency matched to the emission wavelength; and
   a frequency-selective optical path from the incoherent light source to the microscope platform onto the focal plane and from the focal plane through the notch filter.

2. The device of claim 1, wherein the incoherent light source comprises Mercury.

3. The device of claim 2, wherein the notch filter is a cell comprising Mercury.

4. The device of claim 1, further comprising at least one lens for collimating a light emitted from the light source.

5. The device of claim 1, wherein the wide-field light source emits light in at an ultraviolet (UV) frequency.

6. The device of claim 1, further comprising a beam-splitter in the optical path, the beam-splitter configured to Raman signal to the notch filter from the focal plane.

7. The device of claim 1, further comprising an optical fiber between the optical plane and the notch filter.

8. The device of claim 1, further comprising an imaging spectrometer having a high-numerical aperture objective in the optical path after the notch filter.

9. The device of claim 1, wherein the material of the notch filter is matched to the material of the incoherent light source.

10. The device of claim 1, wherein the incoherent light source comprises a low pressure atomic lamp comprising an emission material.

11. The device of claim 1, wherein the incoherent light source comprises an emission material and the notch filter comprises the emission material.

12. The device of claim 1, wherein the incoherent light source comprises Tellurium.

13. The device of claim 11, wherein the notch filter is a cell comprising Tellurium.

14. The device of claim 2, wherein the emission frequency is one of 184.45 nm, 253.7 nm, 365.4 nm, 404.7 nm, 435.8 nm, 546.1 nm, 578.2 nm, and 650 nm.

15. The device of claim 1, wherein the incoherent light source is a wide-field UV light source.

* * * * *